(12) United States Patent
Ma et al.

(10) Patent No.: US 11,396,953 B2
(45) Date of Patent: Jul. 26, 2022

(54) VALVE

(71) Applicant: ILLINOIS TOOL WORKS INC., Glenview, IL (US)

(72) Inventors: Yue Ma, Shanghai (CN); Michael Henker, Shanghai (CN); Zhipeng Deng, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/179,679

(22) Filed: Feb. 19, 2021

(65) Prior Publication Data
US 2021/0254739 A1  Aug. 19, 2021

(30) Foreign Application Priority Data

Feb. 19, 2020 (CN) .......................... 202010106740.9
Jan. 29, 2021 (CN) .......................... 202110129730.1

(51) Int. Cl.
*F16K 27/04* (2006.01)
*F16K 11/076* (2006.01)
*F01P 7/14* (2006.01)
*F01P 7/16* (2006.01)

(52) U.S. Cl.
CPC .......... *F16K 27/041* (2013.01); *F16K 11/076* (2013.01); *F01P 7/16* (2013.01); *F01P 2007/146* (2013.01)

(58) Field of Classification Search
CPC ............................. F16K 27/041; F16K 11/076
USPC ..................................................... 137/625.45
See application file for complete search history.

(56) References Cited

U.S. PATENT DOCUMENTS

| | | | |
|---|---|---|---|
| 4,320,890 A * | 3/1982 | Meyer | F16K 3/186 251/328 |
| 2012/0199210 A1* | 8/2012 | Osborne | F04B 47/00 137/515 |
| 2014/0174544 A1* | 6/2014 | Di Nunzio | F16K 3/30 137/625.45 |

* cited by examiner

*Primary Examiner* — Kevin R Barss
(74) *Attorney, Agent, or Firm* — Quarles & Brady LLP

(57) ABSTRACT

A valve includes a housing, a valve body, a seal member mounting groove, and a seal member which is inserted into the seal member mounting groove from an insertion opening. The seal member is configured to come into contact with the valve body and a housing sealing surface when the valve body closes the housing opening so as to enable the valve body to close a housing opening in a sealed manner. The seal member mounting groove further includes a seal member limiting structure. The seal member limiting structure is disposed on a groove wall. The seal member limiting structure is configured to restrict movement of the seal member toward the valve body relative to the housing.

12 Claims, 12 Drawing Sheets

A-A

B-B

VALVE

CROSS REFERENCE TO RELATED APPLICATIONS

This application claims priority to Chinese Patent Application No. 202010106740.9, filed on Feb. 19, 2020, and Chinese Patent Application No. 202110129730.1, filed on Jan. 29, 2021, both of which are incorporated herein by reference in their entirety.

TECHNICAL FIELD

The present disclosure relates to a valve, and in particular to a coolant valve or a coolant regulating valve for temperature regulation inside an internal combustion engine.

BACKGROUND

A regulating valve (or a thermostatic valve, a temperature regulating valve, etc.) can be used in a temperature regulating system inside an internal combustion engine, and by means of controlling the valve, different coolant channels can be in communication to control the flow path and flow rate of a coolant so as to regulate the temperature of various components inside the internal combustion engine. The valve generally comprises a housing and a valve body. The housing is provided with a plurality of housing channels for respectively connecting different flow paths of the coolant in the temperature regulating system. Inside of the valve, a fluid channel is further provided, the valve body can rotate in the housing, and by means of the rotation of the valve body, the relative position of the fluid channel in the valve and the housing channels in the housing changes, such that the fluid channel can be in communication with or not in communication with the housing channel.

As the internal structure of the internal combustion engine becomes more and more complex, more and more coolant flow paths are required, and accordingly a multi-channel valve has more complex structure.

SUMMARY OF THE DISCLOSURE

At least one object of a first aspect of the present disclosure is to provide a valve, comprising: a housing, with an inner wall of the housing defining a housing cavity, the housing being provided with a housing channel, and the housing channel forming a housing opening in the inner wall; a valve body, the valve body being disposed in the housing cavity of the housing and can be rotated about an axis, and configured to open or close the housing opening; a seal member mounting groove, the seal member mounting groove being disposed in the inner wall around the housing opening, and the seal member mounting groove comprising a groove bottom, a groove wall disposed around at least a portion of the groove bottom, and an insertion opening formed by the groove wall, wherein the groove bottom forms a housing sealing surface; a seal member, which is inserted into the seal member mounting groove from the insertion opening, wherein the seal member is configured to come into contact with the valve body and the housing sealing surface when the valve body closes the housing opening so as to enable the valve body to close the housing opening in a sealed manner; wherein the seal member mounting groove further comprises a seal member limiting structure, the seal member limiting structure being disposed on the groove wall, and the seal member limiting structure being configured to restrict movement of the seal member toward the valve body relative to the housing.

According to the above first aspect, the groove wall comprises an end groove wall and a pair of side groove walls, the pair of side groove walls being located on a first side and a second side of the groove bottom which are opposite each other, and the end groove wall and the insertion opening being located on a third side and a fourth side of the groove bottom which are opposite each other; and wherein the side groove walls extend in the direction of the axis (x), and the seal member is inserted into the seal member mounting groove in the direction of the axis (x).

According to the above first aspect, the seal member limiting structure is symmetrically disposed on the pair of side groove walls. In some embodiments, the valve further comprises a seal member disposed between the valve body and the housing. The seal member is used to enable the fluid channel to be in communication with or not in communication with the housing channel in a sealed manner.

According to the above first aspect, the seal member comprises an inner side sealing portion and an outer side sealing portion, the inner side sealing portion having an inner side sealing surface, the outer side sealing portion having an outer side sealing surface, the inner side sealing surface being configured to be in a shape-fit with the valve body, and the outer side sealing surface being configured to be in a shape-fit with the housing sealing surface.

According to the above first aspect, the seal member limiting structure comprises a pair of stop blocks, the pair of stop blocks being respectively disposed on the pair of side groove walls and extend toward each other; and wherein the pair of stop blocks are spaced a distance from the groove bottom so as to clamp at least a portion of the seal member between the pair of stop blocks and the groove bottom.

According to the above first aspect, the seal member further comprises a neck, the neck being connected between the inner side sealing portion and the outer side sealing portion, wherein the peripheral size of the neck is less than the peripheral sizes of the inner side sealing portion and the outer side sealing portion.

According to the above first aspect, the peripheral size of the neck gradually decreases from two ends to the middle.

According to the above first aspect, at least portions of the pair of side groove walls obliquely extend toward each other in a direction from the housing to the valve body so as to form the seal member limiting structure; and wherein the seal member is clamped between the seal member limiting structure and the groove bottom.

According to the above first aspect, the seal member further comprises a pair of side walls, the pair of side walls obliquely extending toward each other in a direction from the outer side sealing surface to the inner side sealing surface; and wherein the pair of side walls are configured to respectively cooperate with the seal member limiting structures on the pair of side groove walls.

According to the above first aspect, the valve body comprises a blocking tab, the blocking tab having an arc-shaped valve body sealing surface, and the inner side sealing surface being configured to be in a shape-fit with the valve body sealing surface.

According to the above first aspect, the housing has an open end, and the insertion opening of the seal member mounting groove is disposed at the open end; and the valve further comprises a bearing, the bearing being disposed at the open end of the housing and located above the seal member, and the bearing being configured to compress the seal member to make it tightly position within the seal member mounting groove.

According to the above first aspect, the seal member is made of a hard material.

The valve of the present disclosure is simple in structure, and the valve body and the seal member are compactly assembled in the housing, such that more valve bodies can be arranged in the housing in a limited space, accordingly more housing channels are provided, and thus the valve can be used for a temperature regulating system with more flow paths. Moreover, the seal member is made of a hard material, and under the premise of ensuring the sealing property of the seal member, the assembly structure of the seal is simple, and the seal is less prone to falling off.

DETAILED DESCRIPTION OF EMBODIMENTS

Figure 1A:
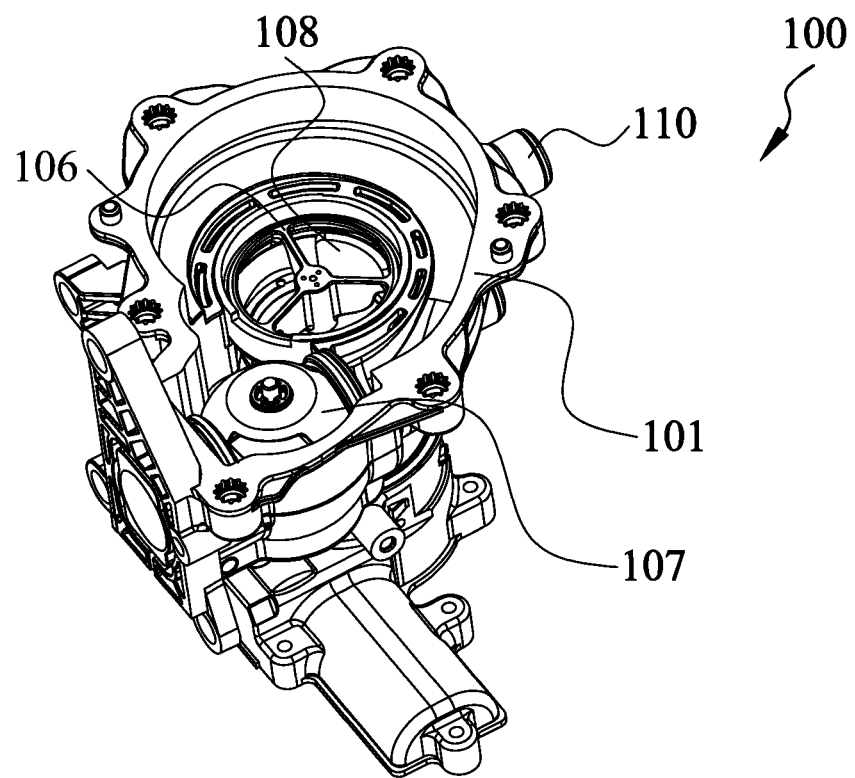
FIGS. 1A and 1B are structural perspective views of a valve according to the present disclosure viewed from two perspectives, with a bearing being omitted in FIG. 1B.

Various specific embodiments of the present disclosure are described below with reference to the accompanying drawings which constitute part of this description. It should be understood that although the terms, such as "front", "rear", "upper", "lower", "left", "right", "top", "bottom", "inner" and "outer", indicating orientations are used in the present disclosure to describe structural parts and elements in various examples of the present disclosure, these terms are used herein only for ease of illustration and are determined based on the exemplary orientations shown in the accompanying drawings. Since the embodiments disclosed in the present disclosure can be arranged in different directions, these terms indicating directions are only illustrative and should not be considered as limitations. If possible, the same or similar reference numerals used in the present disclosure refer to the same components.

For ease of description, in the present disclosure, the direction of the axis x of a drive shaft 105 in a valve 100 is taken as the axial direction of the valve 100 and a housing 101, the direction perpendicular to the axial direction is taken as the radial direction of the valve 100 and the housing 101, and the direction about the axial direction of the valve 100 and the housing 101 is taken as the circumferential direction of the valve 100 and the housing 101.

Figure 1B:
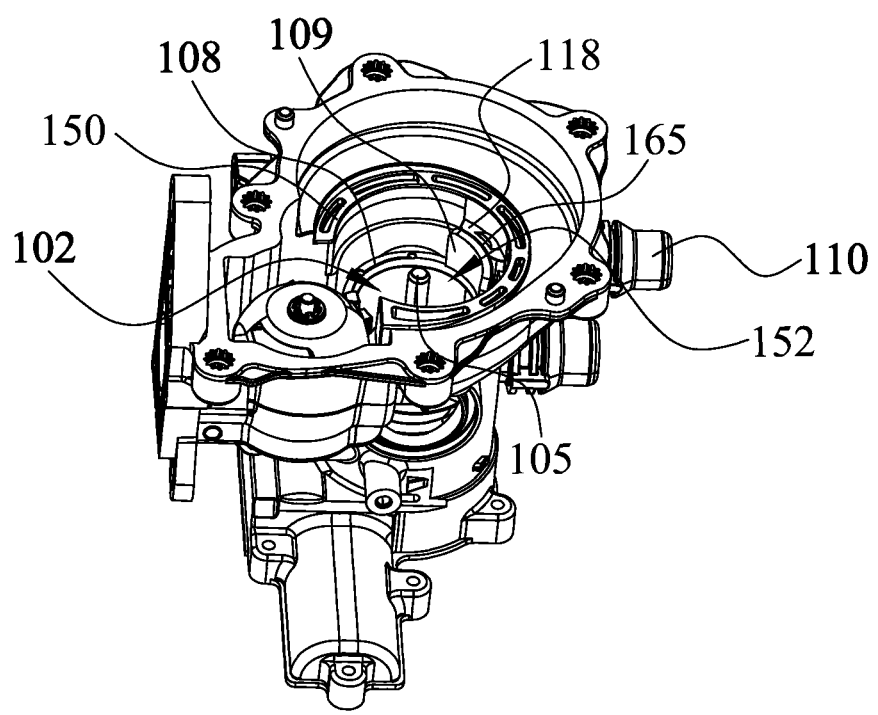

FIGS. 1A and 1B are structural perspective views of the valve 100 according to the present disclosure viewed from two perspectives, used for showing the position of a housing channel 110 in the housing 101, and illustrating the entire structure of the valve 100. A bearing 106 is omitted in FIG. 1B for illustrating a valve body 108 in the valve 100 more clearly.

As shown in FIGS. 1A and 1B, the valve 100 comprises the housing 101, the valve body 108 and the drive shaft 105, inside of the housing 101, a housing cavity 102 is provided, the valve body 108 is accommodated in the housing cavity 102 inside the housing 101, and the drive shaft 105 drives the valve body 108 to rotate about the axis x (see axis x in FIG. 2) in the housing cavity 102.

The housing 101 is provided with a plurality of housing channels, each of the housing channels is connected to different coolant flow paths in a temperature regulating system of an internal combustion engine, and inside of the housing 101, a fluid channel 152 is provided. In this embodiment, the fluid channel 152 is substantially defined by the housing cavity 102. As the valve body 108 rotates in the housing 101, the fluid channel 152 in the housing 101 can be in communication with or not in communication with one of the plurality of housing channels such that different flow paths in the temperature regulating system are in communication or not in communication. The plurality of housing channels include the housing channel 110, and the housing channel 110 is taken as an example below to illustrate how the housing channel 110 is in communication with and not in communication with the fluid channel 152.

The upper portion of the housing 101 has an open end 150, the bearing 106 is disposed at the open end 150, the open end 150 is configured, at one side above the bearing 106, to be in communication with a coolant pump (not shown in figures), and the open end 150 is configured, at one side below the bearing 106, to be in communication with the fluid channel 152. A plurality of channels are disposed in the bearing 106 at intervals, such that the coolant pump can be in fluid communication with the fluid channel 152 through the channels in the bearing 106. The specific structure of the bearing 106 will be described in detail below with reference to FIGS. 5A and 5B.

The valve body 108 comprises a blocking tab 109, and the blocking tab 109 is configured to cooperate with the housing channel 110 to block the housing channel 110 from the fluid channel 152. The valve 100 further comprises an additional valve body 107. The specific structures of the valve body 108 and the additional valve body 107 will be described in detail below with reference to FIG. 2.

The valve 100 further comprises a seal member 118, and the seal member 118 is connected inside the housing 101. The seal member 118 can cooperate with the blocking tab 109 of the valve body 108 to form a valve body sealing structure 165. When the valve body 108 rotates to a position that makes the housing channel 110 not in communication with the fluid channel 152, the seal member 118 can come into contact with the blocking tab 109 of the valve body 108, such that the valve body 108 enables the housing channel 110 to be not in communication with the fluid channel 152 in a sealed manner.

It should be noted that although the valve 100, as shown in FIGS. 1A and 1B, is longitudinally disposed such that the drive shaft 105 is disposed in a longitudinal direction, when the valve 100 is mounted in an internal combustion engine, according to the specific design of the internal combustion engine, the valve 100 may also be transversely disposed such that the drive shaft 105 is disposed in a transverse direction.

Figure 2:
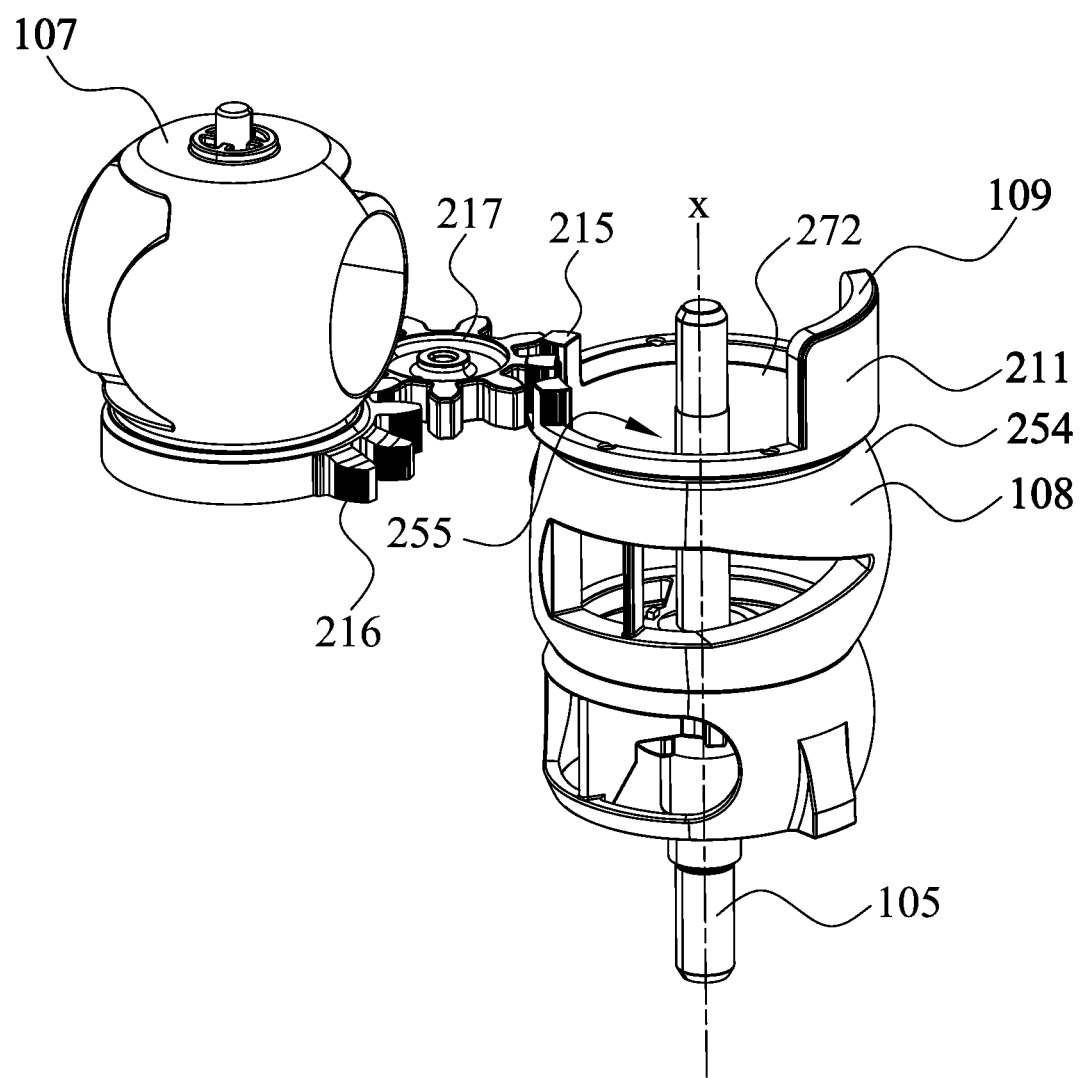
FIG. 2 is a structural perspective view of a valve body, a gear and an additional valve body of the valve shown in FIG. 1A.

FIG. 2 is a structural perspective view of the valve body 108, a gear 217 and the additional valve body 107 in the valve 100 shown in FIG. 1A for illustrating the specific structure of the valve body 108 and a cooperative structure of the valve body 108, the gear 217 and the additional valve body 107.

As shown in FIG. 2, the valve body 108 comprises a ball valve portion 254, with the upper portion of the ball valve portion 254 being of a substantially spherical shape, and the top thereof being provided with a valve body opening 255. The interior of the valve body 108 is hollow, and through the valve body opening 255, a hollow portion 272 in the valve body 108 is in communication with the housing cavity 102 outside the valve body 108 so as to together form the fluid channel 152. The lower portion of the ball valve portion 254 is connected to the drive shaft 105, such that when the drive shaft 105 rotates about an axis x thereof, the valve body 108 can be rotated therewith about the axis x.

The top of the ball valve portion 254 is provided with the blocking tab 109, the outer side of the blocking tab 109 has a valve body sealing surface 211, the valve body sealing surface 211 is a smooth arc surface, and the seal member 118 has a shape matching with the shape of the valve body sealing surface 211, such that the valve body sealing surface 211 can come into contact with the seal member 118 to form the valve body sealing structure 165, and thus the seal member 118 enable the fluid channel 152 to be not in communication with the housing channel 110 in the housing 101 in a sealed manner. As an example, the blocking tab 109 is formed by extending upward in the axial direction of the valve 100 (i.e., in the direction of the axis x of the drive shaft 105) from the top edge, at the valve body opening 255, of the ball valve portion 254. In other examples, the blocking tab 109 may also be formed by extending outward in the radial direction of the valve 100 from the top edge, at the valve body opening 255, of the ball valve portion 254, as long as ensuring that the blocking tab 109 has a valve body sealing surface that cooperates with the seal member 118.

In this embodiment, the valve 100 further comprises the additional valve body 107, the additional valve body 107 is disposed outside the valve body 108, and the additional valve body 107 is also internally provided with a fluid channel in fluid communication with the coolant pump. The blocking tab 109 has a partially cylindrical shape, and only occupies part of the top edge of the ball valve portion 254 in the circumferential direction of the valve 100 (i.e., the direction of rotation of the drive shaft 105). On the top of the ball valve portion 254, at the side opposite the blocking tab 109, engaging teeth 215 are provided, and the additional valve body 107 engages with the valve body 108 through the engaging teeth 215. Thus, when the valve body 108 rotates in a certain range, the additional valve body 107 can be driven to rotate together. Specifically, the bottom of the additional valve body 107 is also provided with engaging teeth 216, and the engaging teeth 216 of the additional valve body 107 engage with the engaging teeth 215 of the valve body 108 through the gear 217. In this embodiment, the valve body 108 and the additional valve body 107 are disposed in a staggered manner in the axial direction and are separated by means of the gear 217 in the radial direction, such that the additional valve body 107 will not come into contact with the valve body 108 to cause interference. By setting the length of the engaging teeth 215 in the circumferential direction of the top edge of the ball valve portion 254, the additional valve body 107 can be driven to rotate when the valve body 108 rotates in a certain range. When the valve body 108 rotates to a position that the engaging teeth 215 disengage from the gear 217, the rotation of the valve body 108 will not drive the additional valve body 107 to rotate.

By means of configuring the valve body 108 in this way, it is possible to arrange the valve body 108 and the additional valve body 107 in the housing 101 as compact as possible, under the premise of ensuring that the valve body 108 and the additional valve body 107 do not interfere with each other. Moreover, by means of simplifying the structure of the valve body 108, the volume of the valve body 108 is reduced, such that the volume of the housing cavity 102 inside the housing 101 can be reduced, and then the volume of the housing 101 is reduced. By means of providing more valve bodies in a limited internal space of the internal combustion engine, it is possible to accordingly provide more housing channels and connect these housing channels to more coolant flow paths in the temperature regulating system.

Figure 3A:
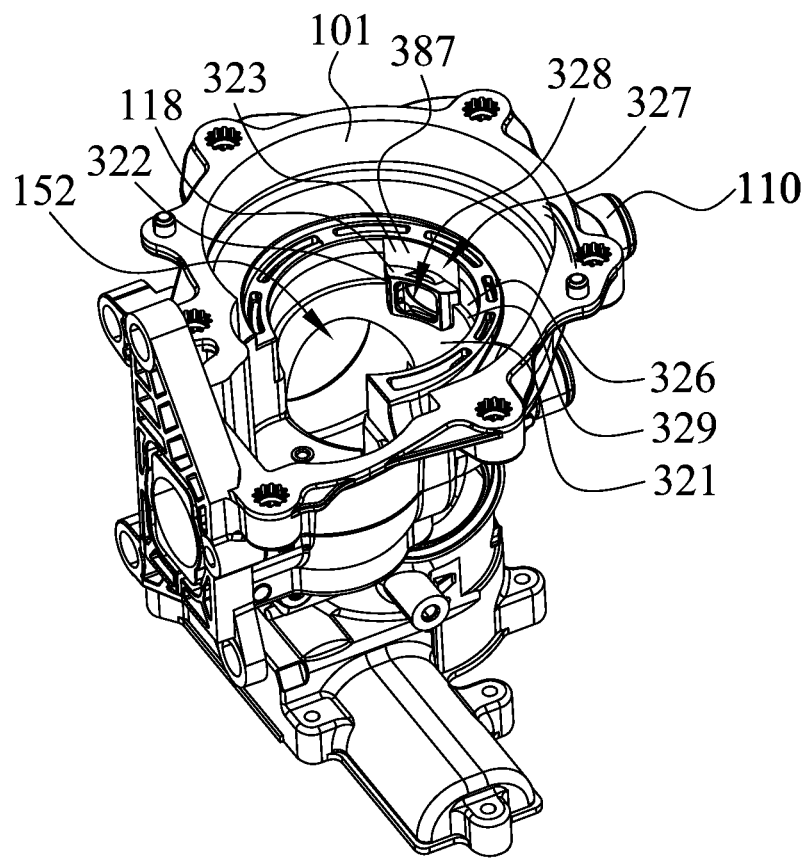
FIG. 3A is a structural perspective view of a housing and a seal member of the valve shown in FIG. 1A.
Figure 3B:
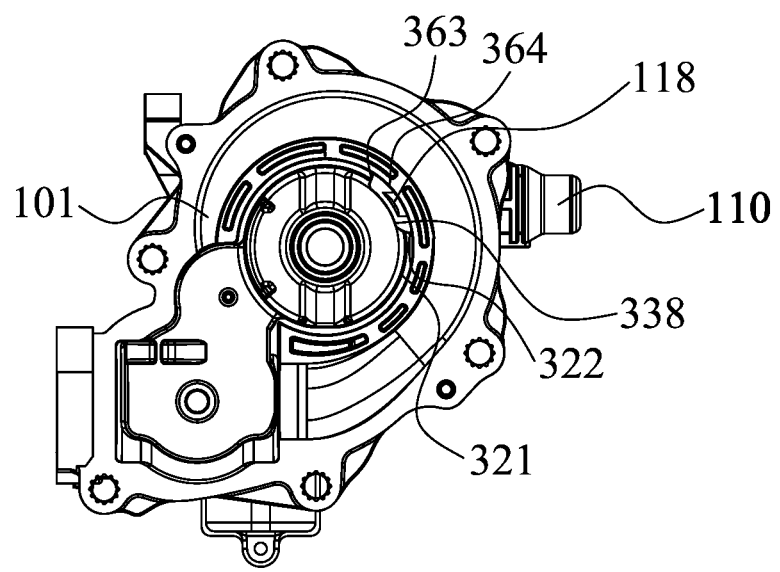
FIG. 3B is a top view of FIG. 3A.
Figure 3C:
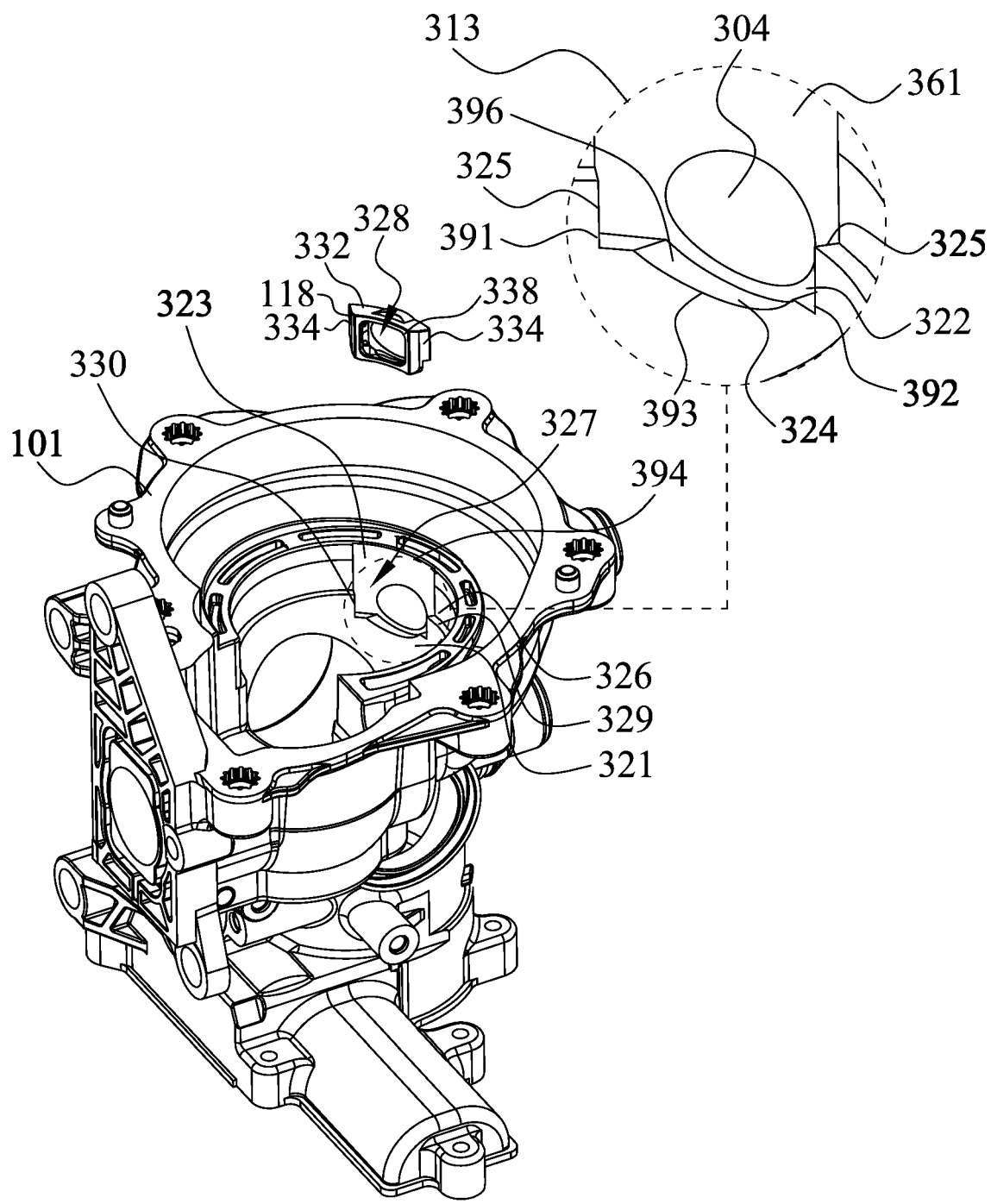
FIG. 3C is a structural exploded view of FIG. 3A.

FIGS. 3A-3C are used to illustrate the specific structure of the housing 101. FIG. 3A is a structural perspective view of the housing 101 and the seal member 118, FIG. 3B is a top view of FIG. 3A, and FIG. 3C is a structural exploded view of FIG. 3A. FIG. 3A is used to illustrate the overall structure of the housing 101 and the seal member 118 assembled together, FIGS. 3B and 3C are used to illustrate the specific structure of a seal member mounting groove 322 in the housing 101, and the dashed box 313 in FIG. 3C is a partially enlarged view.

As shown in FIGS. 3A-3C, the housing 101 has an inner wall 323, and as an example, the inner wall 323 is of a substantially cylindrical shape, the inner wall 323 is provided with the seal member mounting groove 322 extending in the axial direction (i.e., in the direction of the axis x), and the seal member 118 is mounted in the seal member mounting groove 322. Specifically, the housing channel 110 of the housing 101 forms a housing opening 304 in the inner wall 323, and the seal member mounting groove 322 is disposed in the inner wall 323 around the housing opening 304. As the valve body 108 rotates, the valve body 108 can close the housing opening 304 in a sealed manner to enable the housing channel 110 to be not in communication with the fluid channel 152, or open the housing opening 304 to enable the housing channel 110 to be in communication with the fluid channel 152.

As an example, the inner wall 323 comprises an upper inner wall 326 and a lower inner wall 321, wherein the lower inner wall 321 protrudes inwardly in the radial direction relative to the upper inner wall 326 (i.e., protruding toward the valve body 108 relative to the housing 101), so as to form a stepped surface 329 between the upper inner wall 321 and the lower inner wall 326. The seal member mounting groove 322 comprises a groove bottom 387, a groove wall 396 and an insertion opening 327. The groove bottom 387 forms a housing sealing surface 361 for cooperating with the seal member 118, the groove wall 396 is disposed around the groove bottom 387 below the stepped surface 329, and the insertion opening 327 is formed above the groove wall 396. In the illustrated embodiment, an operator inserts the seal member 118 into the seal member mounting groove 322 from the insertion opening 327 so as to mount the seal member 118 into the seal member mounting groove 322.

Specifically, the groove wall 396 of the seal member mounting groove 322 comprises a pair of side groove walls 325 and an end groove wall 324. The pair of side groove walls 325 are respectively located on a first side 391 and a second side 392 of the groove bottom 387 which are opposite in the circumferential direction of the housing 101, and the end groove wall 324 and the insertion opening 327 are respectively located on a third side 393 and a fourth side 394 of the groove bottom 387 which are opposite in the axial direction of the housing 101. The pair of side groove walls 325 extend in the axial direction (i.e., in the direction of the axis x) such that the seal member 118 can be inserted into the seal member mounting groove 322 from the insertion opening 327 in the axial direction.

Still as shown in FIGS. 3A-3C, an anti-off structure 363 is disposed between the seal member 118 and the seal member mounting groove 322, and the anti-off structure 363 is used for preventing the seal 118 from escaping from the seal member mounting groove 322. A housing sealing structure 364 is provided between the seal member 118 and the housing 101, and the housing sealing structure 364 is configured to enable the housing 101 to be in sealed contact with the seal member 118. Moreover, a valve body sealing structure 165 is provided between the seal member 118 and the valve body 108, and the valve body sealing structure 165 is configured to enable the valve body 108 to be in sealed contact with the seal member 118.

Specifically, the seal member mounting groove 322 also comprises a seal member limiting structure 330. The seal member limiting structure 330 can restrict the seal member 118 from moving inward in the radial direction (i.e., moving toward the valve body 108 relative to the housing 101) after the seal member 118 is mounted into the seal member mounting groove 322. As an example, the seal member limiting structure 330 is symmetrically disposed on the pair of side groove walls 325. The pair of side groove walls 325 obliquely extend toward each other in a direction from the housing 101 to the valve body 108 so as to form the seal member limiting structure 330. That is to say, the side groove walls 325 are formed by obliquely extending in the axial direction of the housing 101 and away from the radial direction of the housing 101. The seal member 118 also has a pair of side walls 334 disposed opposite each other, and the pair of side walls 334 also obliquely extend toward each other in a direction from the housing 101 to the valve body 108, so as to form a shape substantially the same as the pair of side groove walls 325. When the seal member 118 is mounted in the seal member mounting groove 322, the seal member 118 is clamped between the seal member limiting structure 330 and the groove bottom 387, and a pair of side walls 334 of the seal member 118 can be tightly abutted a pair of side groove walls 325 of the seal member mounting groove 322, so as to prevent the seal member 118 from circumferentially moving in the direction of rotation of the drive shaft 105. Moreover, the oblique side groove walls 325 can also prevent the seal member 118 from moving toward the drive shaft 105 in the radial direction. Thus, the seal member limiting structure 330 of the seal member mounting groove 322 and the side wall 334 of the seal member 118 together form the anti-off structure 363.

Of course, those skilled in the art would have appreciated that the anti-off structure 363 may also comprise other structures, for example, the seal member limiting structure 330 may be configured as other structures, and the structure of the seal member 118 is configured accordingly to prevent the seal member 118 from escaping from the seal member mounting groove 322. For example, the seal member limiting structure may be configured as stop groove extending in opposite directions on the pair of side groove walls 325, or as stop blocks extending toward each other on the pair of side groove walls 325, etc. In some embodiments, the seal member limiting structure 330 may also be disposed on the end groove wall 324 or on the groove bottom 387.

By means of providing the anti-off structure 363, even if the blocking tab 109 of the valve body 108 leaves the seal member 118 and no longer abuts against the seal member 118 from the inside, the seal member 118 cannot move inward in the radial direction and escaping from the seal member mounting groove 322.

As shown in FIG. 3C, the end groove wall 324 of the seal member mounting groove 322 is used for bearing and supporting the seal member 118. When the seal member 118 is inserted downward into the seal member mounting groove 322 from insertion opening 327, the end groove wall 324 can prevent the seal member 118 from continuing to move downward in the extension direction of the drive shaft 105. As seen in conjunction with the bearing 106 for compressing the seal 118 in FIG. 1A, the bearing 106 can cooperate with the end groove wall 324 to together restrict the position of the seal member 118 relative to the housing 101 in the extension direction of the drive shaft 105. As an example, the end groove wall 324 has a shape matching with that of bottom portion 433 (not shown in FIG. 3C, and see FIG. 4B) of the seal member 118, and the bearing 106 has a shape matching with that of top portion 332 of the seal member 118.

By means of providing the end groove wall 324 and the bearing 106, which are in a shape-fit with the seal member 118, the axial movement of the seal member 118 can be restricted. Thus, the seal member 118 can be securely connected in the seal member mounting groove 322.

Still as shown in FIGS. 3B and 3C, the housing sealing surface 361 is of a substantially arc shape, and the housing opening 304 is located in the housing sealing surface 361. The seal member 118 has an inner side sealing surface 338 and an outer side sealing surface 447 (not shown in FIGS. 3B and 3C, and see FIG. 4B). The outer side sealing surface 447 has an arc shape matching with the shape of the housing sealing surface 361, such that when the seal member 118 is mounted in the seal member mounting groove 322, the outer side sealing surface 447 is tightly abutted the housing sealing surface 361 to form the housing sealing structure 364. The inner side sealing surface 338 has an arc shape matching with the shape of the valve body sealing surface 211 of the blocking tab 109 of the valve body 108, such that when the valve body 108 rotates a certain angle, the inner side sealing surface 338 is tightly abutted the valve body sealing surface 211 to form the valve body sealing structure 165. In this embodiment, the seal member 118 has a thickness greater than that of the seal member mounting groove 322, such that the inner side sealing surface 338 of the seal member 118 protrudes inward beyond a lower side inner wall 321 of the housing 101, and therefore the inner side sealing surface 338 can come into contact with the valve body sealing surface 211 and form the valve body sealing structure 165.

The seal member 118 further comprises a seal member channel 328 that penetrates the inner side sealing surface 338 and the outer side sealing surface 447. When the seal member 118 is mounted in the seal member mounting groove 322, the seal member channel 328 is in fluid communication with the housing opening 304 and thus in fluid communication with the housing channel 110. Therefore, the seal member 118 enables the fluid channel 152 to be in fluid communication with the housing channel 110 through the seal member channel 328.

Figure 4A:
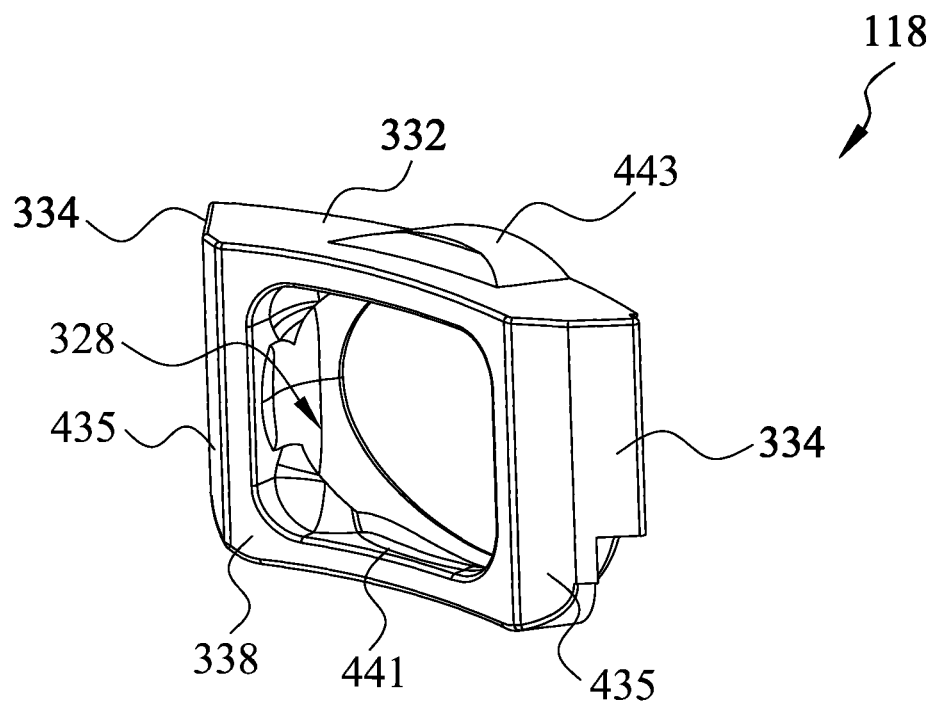
FIGS. 4A and 4B are structural perspective views of the seal member in the valve shown in FIG. 1A viewed from two perspectives.
Figure 4B:
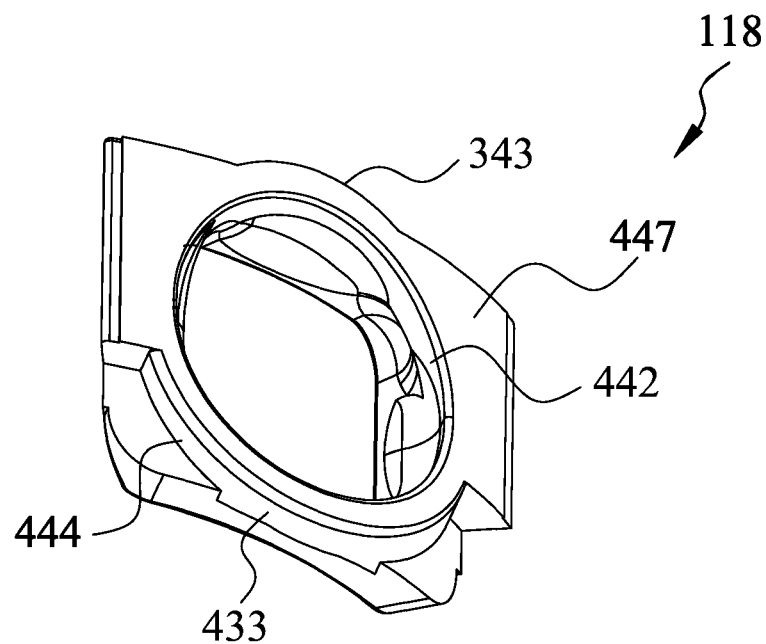

FIGS. 4A and 4B are structural perspective views of the seal member 118 viewed from the front side and the rear side for illustrating a more specific structure of the seal member 118. As shown in FIGS. 4A and 4B, the seal member 118 has: an inner side sealing portion and an outer side sealing portion opposite each other, with an inner surface of the inner side sealing portion forming the inner side sealing surface 338 for forming the valve body sealing structure 165, and an outer surface of the outer side sealing portion forming the outer side sealing surface 447 for forming the housing sealing structure 364; a pair of side walls 334 for forming the anti-off structure 363; and a top portion 332 and a bottom portion 433 of the seal member 118. The inner side sealing surface 338 and the outer side sealing surface 447 are of a substantially concentric arc shape, the inner side sealing surface 338 is provided with an inner side opening 441, the outer side sealing surface 447 is provided with an outer side opening 442, and the inner side opening 441 is in fluid communication with the outer side opening 442 via the seal member channel 328. Thus, the inner side opening 441 can be in fluid communication with the housing channel 110 through the seal member channel 328. When the valve body 108 rotates to a position that enables the blocking tab 109 to come into contact with the inner side sealing surface 338 and form the valve body sealing structure 165, the blocking tab 109 can close the inner side opening 441, so as to close the seal member channel 328 and then enable the housing channel 110 to be not in fluid communication with the fluid channel 152.

As an example, the outer side opening 442 has the same shape and size as those of the housing opening 304, for example, the outer side opening 442 and the housing opening 304 are of a substantially circular or oval shape with the same size. The inner side opening 441 has a shape different from that of the outer side opening 442, and the inner side opening 441 is substantially square. In order to prevent the seal member 118 from changing the flow velocity and flow rate of the coolant flowing between the fluid channel 152 and the housing channel 110, the inner side opening 441 and the outer side opening 442 are different in shape but have the same flow area, and the seal member channel 328 is smoothly connected between the inner side opening 441 and the outer side opening 442, such that the flow velocity and flow rate of the fluid flowing through the outer side opening 442 are the same as the flow velocity and flow rate of the fluid flowing through the inner side opening 441. Provided that the inner side opening 441 and the outer side opening 442 have the same flow area and the same width, the height of the square inner side opening 441 is less than that of the circular outer side opening 442, so as to save on the space occupied by the inner side sealing portion of the seal member 118 in the height direction to ensure that a safety clearance can be reserved between the blocking tab 109, on the inner side of the inner side sealing portion of the seal member 118, and the bearing 106 in the axial direction, thereby preventing the bearing 106 from interfering the rotation of the blocking tab 109.

As an example, the top portion 332 of the seal member 118 has an arc-shaped upper protrusion 443, and the arc-shaped upper protrusion 443 is used to cooperate with the bearing 106. Moreover, an outer side portion of the bottom portion 433 of the seal member 118 is recessed upward to form an arc-shaped lower protrusion 444. The arc-shaped lower protrusion 444 is in a shape-fit with the end groove wall 324 of the seal member mounting groove 323. When the seal member 118 is mounted in the seal member mounting groove 322, the arc-shaped lower protrusion 444 can be supported on the end groove wall 324, and an inner side portion of the bottom portion 433 abuts against the lower side inner wall 321 at the corresponding position, such that the inner side sealing surface 338 protrudes inward beyond the inner wall 323 to come into contact with the valve body 108.

As shown in FIG. 4A, a pair of side walls 334 and a pair of chamfered surfaces 435 are connected between a pair of corresponding edges of the sides of the inner side sealing surface 338 and the outer side sealing surface 447. The chamfered faces 435 are connected on the inner sides of the side walls 334 and connected to the inner side sealing surface 338, and are used to cooperate with the edges of the blocking tab 109 of the valve body 108 for guide purpose. As described above, the side walls 334 are connected to the outer side sealing surface 447.

In this embodiment, the seal member 118 is made of a hard material. It should be noted that the hard material is harder than a soft material such as rubber, for example, the seal member 118 may be made of a plastic material or made of a metal material. When the seal member 118 is made of the hard material, the seal member 118 may have better supporting strength, abrasion resistance, heat resistance, etc. By means of providing the seal member mounting groove 322 with a simple structure, the seal member 118 can be secured and is less prone to escaping.

Figure 5A:
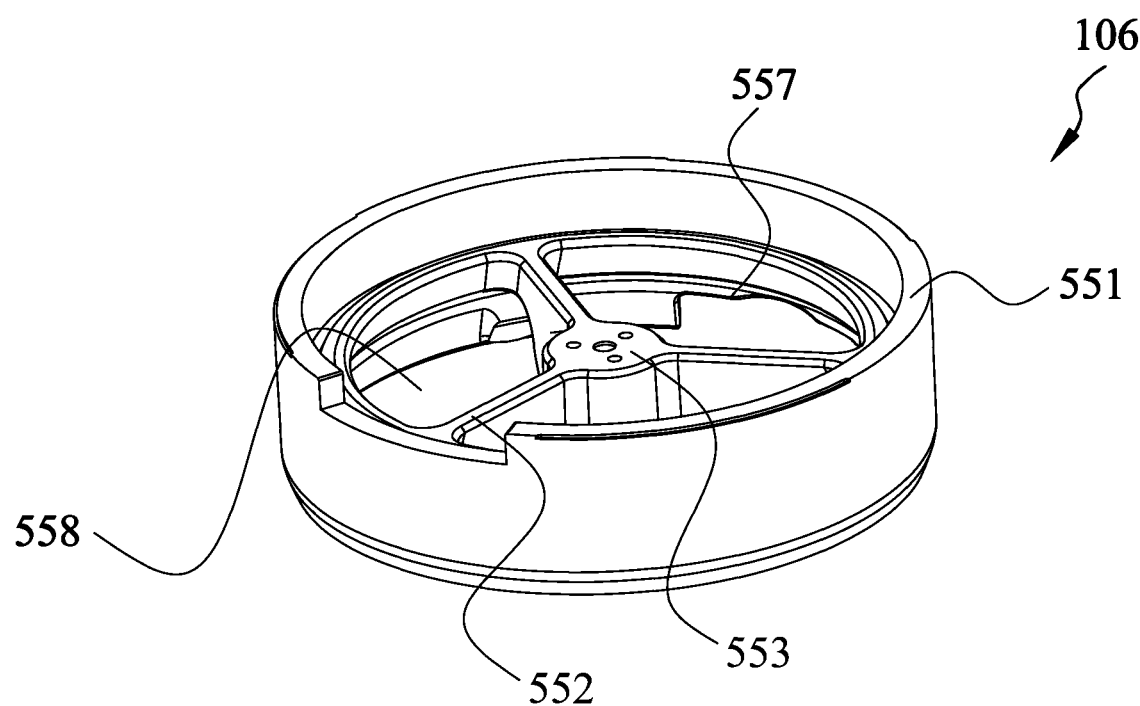
FIGS. 5A and 5B are structural perspective views of the bearing in the valve shown in FIG. 1A viewed from two perspectives.
Figure 5B:
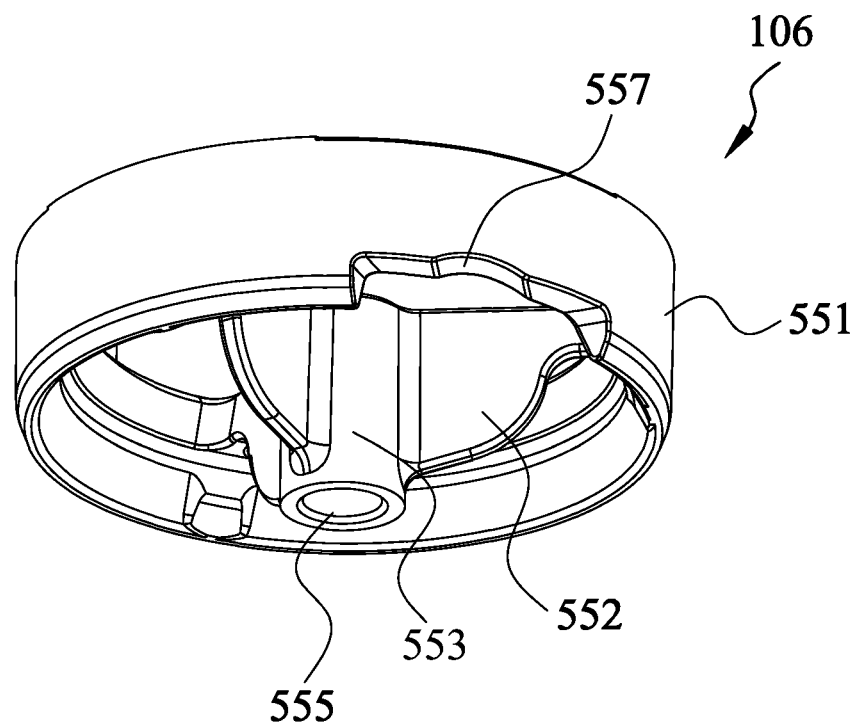

FIGS. 5A and 5B are structural perspective views of the bearing 106 viewed from the top and the bottom, for illustrating the specific structure of the bearing 106. As shown in FIGS. 5A and 5B, the bearing 106 comprises an annular ring 551 and a central support portion 553. The central support portion 553 is supported at a central position of the annular ring 551 by means of a plurality of support rods 552 disposed at intervals. The lower end of the central support portion 553 is provided with a shaft hole 555. The shaft hole 555 is configured to accommodate one end of the drive shaft 105 such that the bearing 106 can support the drive shaft 105. The adjacent support rods 552 define a plurality of channels 558 therebetween, and through the channels 558, the coolant pump (not shown in figures) connected above the bearing 106 can be in fluid communication with the fluid channel 152 in the housing 101 below the bearing 106. In this embodiment, three support rods 552 are provided, and form an angle of about 120° with respect to each other, and three channels 558 are formed as well.

The lower surface of the annular ring 551 is provided with a groove 557 recessed upward, and the groove 557 has a shape matching with that of the top portion 332 of the seal member 118 such that the bearing 106 can compress the seal member 118 within the seal member mounting groove 322 from the above.

Figure 6A:
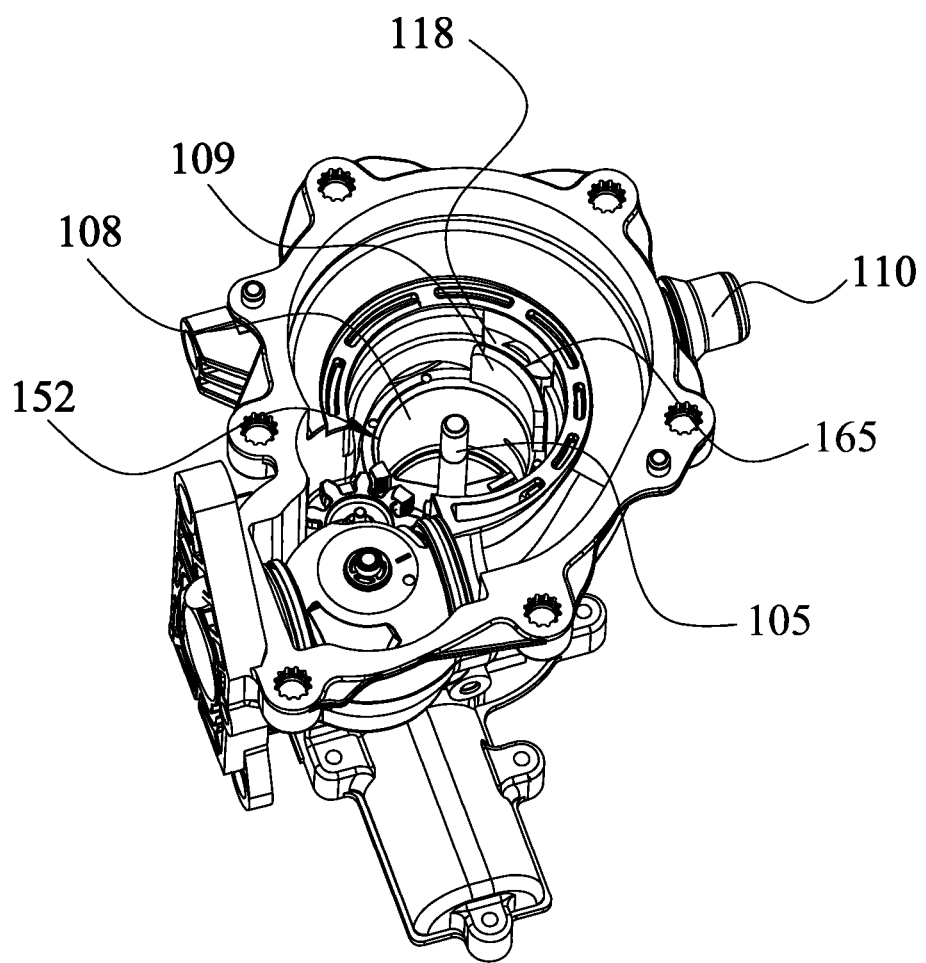
FIGS. 6A-6C are structural views of the valve shown in FIG. 1A in a state where a fluid channel is not in communication with a housing channel.
Figure 6B:
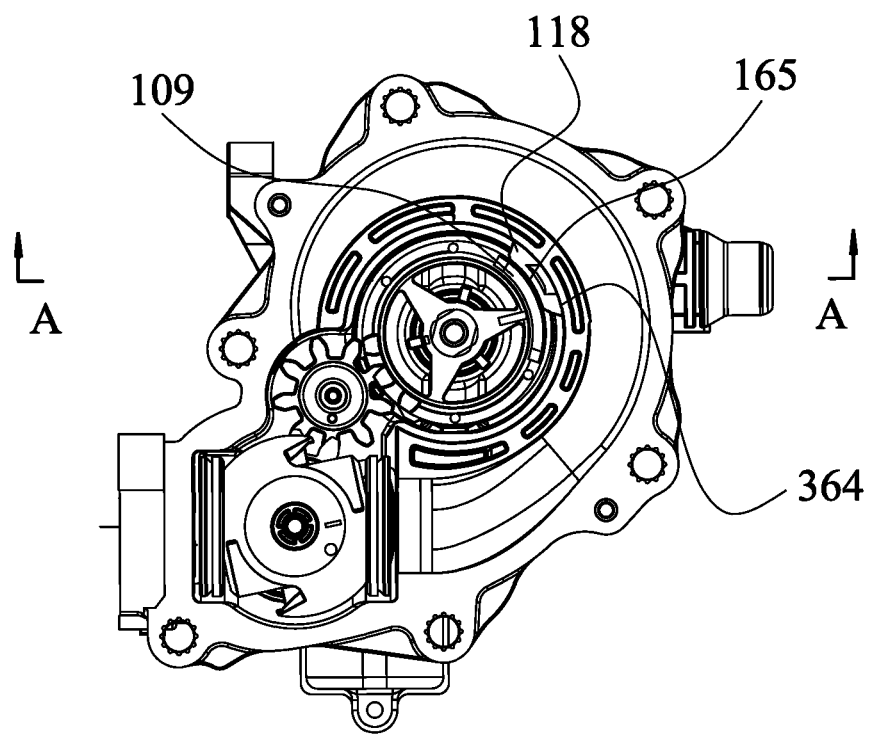
Figure 6C:
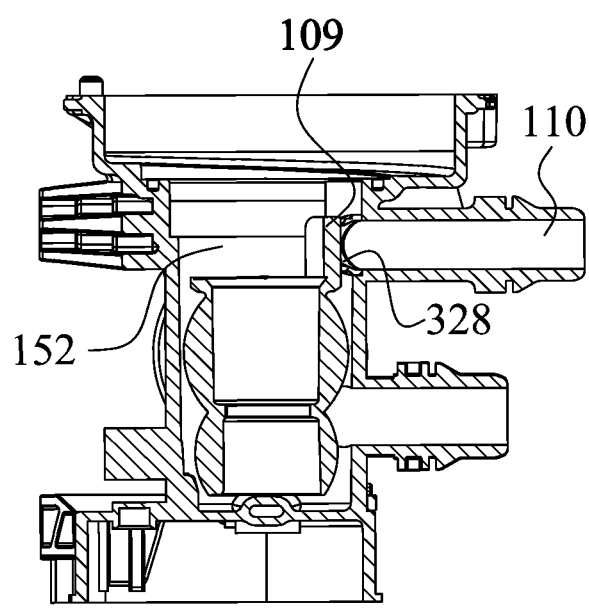

FIGS. 6A-6C show structural views of the valve 100 in a state where the fluid channel 152 is not in fluid communication with the housing channel 110, and the bearing 106 is omitted in order to illustrate the internal structure of the valve 100 more clearly. FIG. 6A is the structural perspective view of the valve 100 in this state, FIG. 6B is a top view of FIG. 6A, and FIG. 6C is a cross-sectional view taken along line A-A in FIG. 6B.

As shown in FIG. 6A, driven by the drive shaft 105, the valve body 108 rotates to the position shown in FIG. 6A. At this time, the blocking tab 109 of the valve body 108 is tightly abutted the inner side sealing surface 338 of the seal member 118 to form the valve body sealing structure 165, and the blocking tab 109 closes the inner side opening 441 of the seal member 118 in a sealed manner and thus closes the housing opening 304 in a sealed manner.

As shown in FIG. 6B, at this time, the seal member 118 is held in the seal member mounting groove 322, and the outer side sealing surface 447 of the seal member 118 and the housing sealing surface 361 of the housing 101 are tightly abutted each other to form the housing sealing structure 364.

As shown in FIG. 6C, although at this time the housing channel 110 is still in communication with the seal member channel 328 through the outer side opening 442 in the outer side sealing surface 447, the blocking tab 109 closes the seal member channel 328 of the seal member 118 in a sealed manner. Therefore, the blocking tab 109 can close the housing opening 304 in a sealed manner such that the housing channel 110 is not in fluid communication with the fluid channel 152 in a sealed manner under the effect of the valve body sealing structure 165.

Figure 7A:
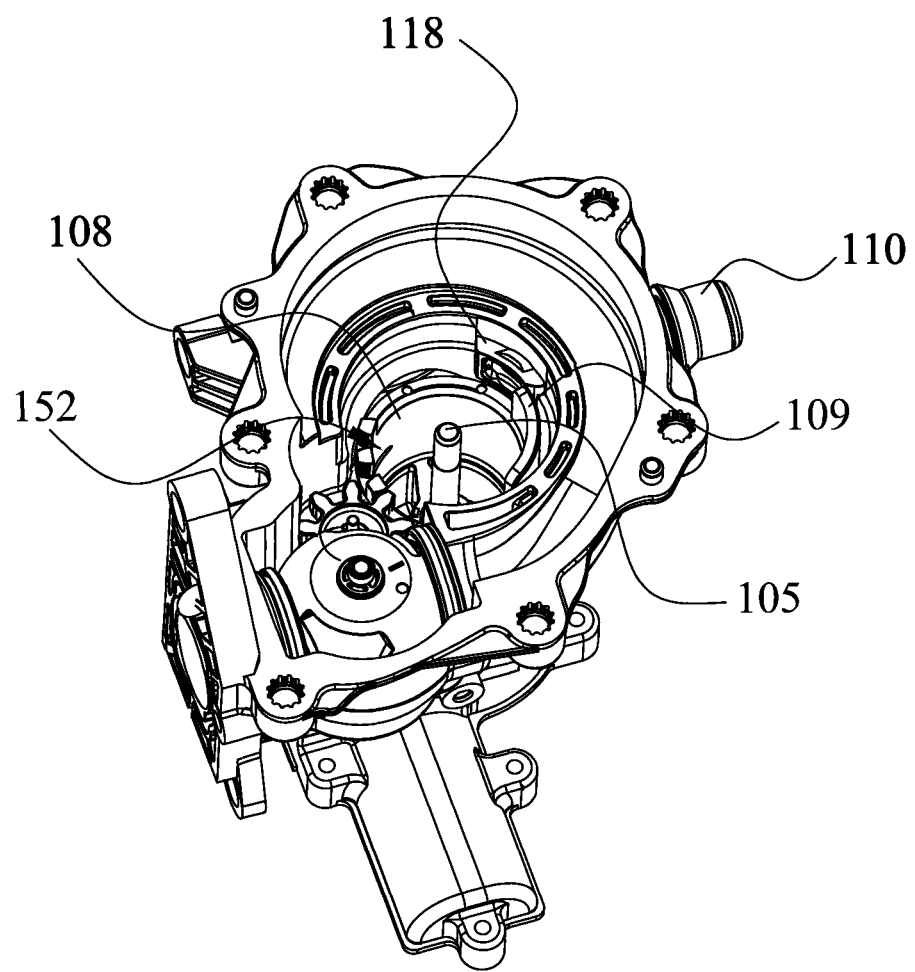
FIGS. 7A-7C are structural views of the valve shown in FIG. 1A in a state where the fluid channel is in communication with the housing channel.
Figure 7B:
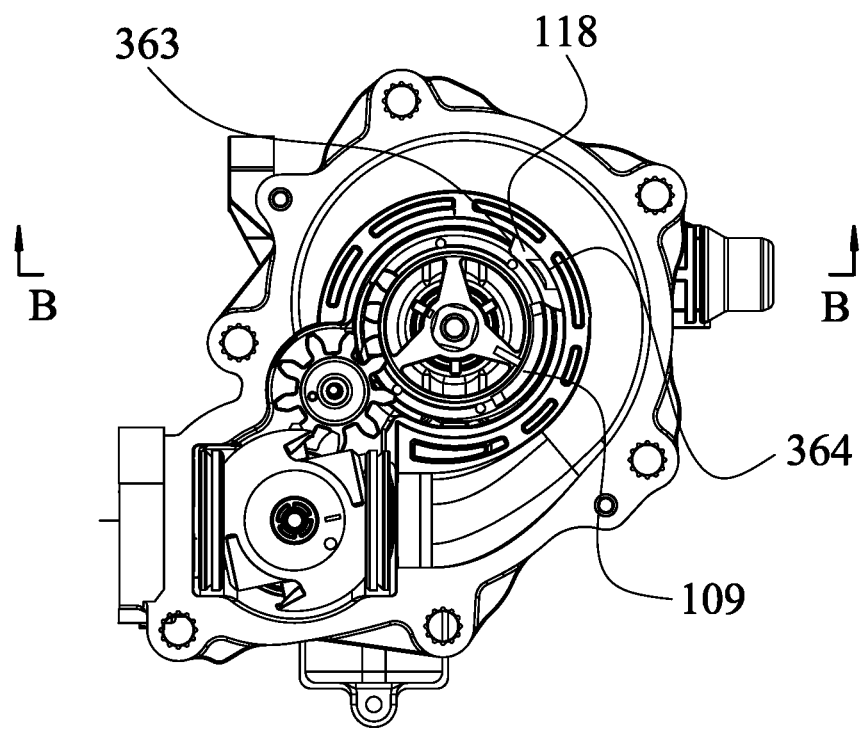
Figure 7C:
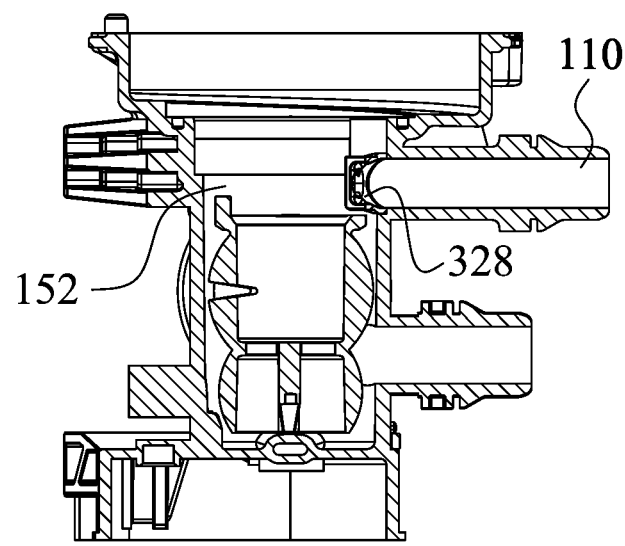

FIGS. 7A-7C show structural views of the valve 100 in a state where the fluid channel 152 is in communication with the housing channel 110, and the bearing 106 is also omitted in order to show the internal structure of the valve 100 more clearly. FIG. 7A is a structural perspective view of the valve 100 in the communicating state, FIG. 7B is a top view of FIG. 7A, and FIG. 7C is a cross-sectional view taken along line B-B of FIG. 7B.

As shown in FIG. 7A, driven by the drive shaft 105, the valve body 108 rotates to the position shown in FIG. 7A. At this time, the blocking tab 109 of the valve body 108 leaves the inner side sealing surface 338 of the seal member 118 and no longer forms the valve body sealing structure 165, the inner side opening 441 of the seal member 118 is opened, and the housing opening 304 is thus opened, such that the housing channel 110 can be in communication with the fluid channel 152.

As shown in FIG. 7B, although the blocking tab 109 leaves the inner side sealing surface 338 of the seal member 118, owing to the anti-off structure 363 on the seal member mounting groove 322, the seal member 118 is still retained in the seal member mounting groove 322. At this time, the outer side sealing surface 447 of the seal member 118 is still tightly abutted the housing sealing surface 361 of the housing 101 to form the housing sealing structure 364.

As shown in FIG. 7C, at this time, the housing channel 110 is in fluid communication with the seal member channel 328 through the outer side opening 442 in the outer side sealing surface 447. Moreover, the seal member channel 328 is in fluid communication with the fluid channel 152 through the inner side opening 441, such that the housing channel 110 is in fluid communication with the fluid channel 152 through the seal member channel 328.

When the valve body 108 comprises a partially formed blocking tab 109, the space can be made to connect the valve body 108 and the additional valve body 107, thereby avoiding the interference therebetween. According to the present disclosure, by means of providing the valve body 108 and the additional valve body 107, under the premise of forming more coolant flow paths in the valve 100, the valve body 108 and the additional valve body 107 can be arranged in the housing 101 as compact as possible, thereby reducing the volume of the valve 100, saving on the materials and reducing the weight of the valve 100. However, this tends to cause the seal member 118 to escape when it is not in contact with the blocking tab 109, thereby compromising the function of the valve 100. According to the present disclosure, by means of providing the anti-off structure 363 to prevent the seal member 118 from moving in the radial and circumferential directions of the drive shaft 105 relative to the seal member mounting groove 322, and then by means of providing the end groove wall 324 and the bearing 106, which match with the structure of the seal member 118 to prevent the seal member 118 from moving in the axial direction of the drive shaft 105, in this way, the seal member 118 can be well retained in the seal member mounting groove 322 only by means of the designed structure, and the assembly can be achieved by only inserting the seal member 118 into the seal member mounting groove 322 from top to bottom, such that the assembly process is simple.

In addition, since the seal member 118 is made of the hard material in the present disclosure, the seal member 118 may have better supporting strength, abrasion resistance, heat resistance, etc. Therefore, by means of providing the seal member mounting groove 322 with a simple structure, the seal member 118 can be secured and is less prone to escaping. Moreover, in the present disclosure, by means of designing the inner side opening and the outer side opening of the seal member 118 to have different shapes, the space occupied by the seal member, such as the height, can be saved, and the space of the valve body and the housing can be saved.

Figure 8A:
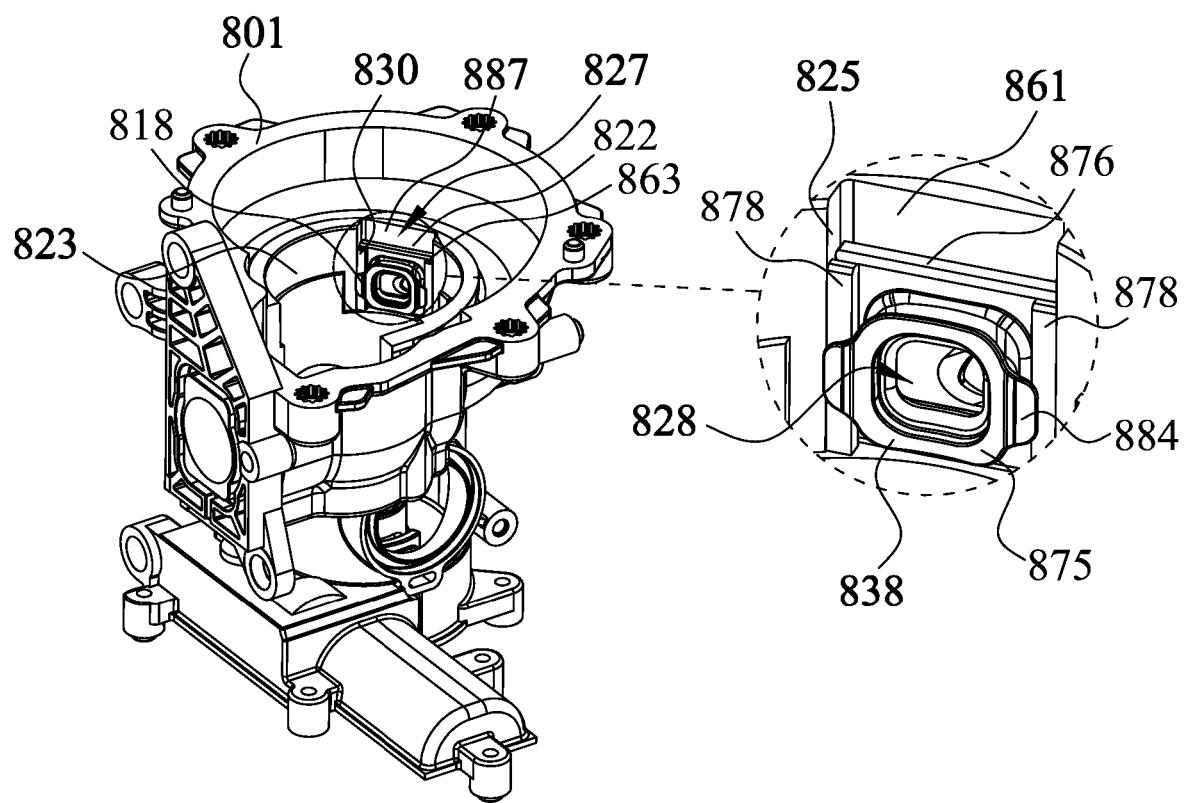
FIG. 8A shows a structural perspective view of a housing and a seal member according to another embodiment of the valve of the present disclosure.
Figure 8B:
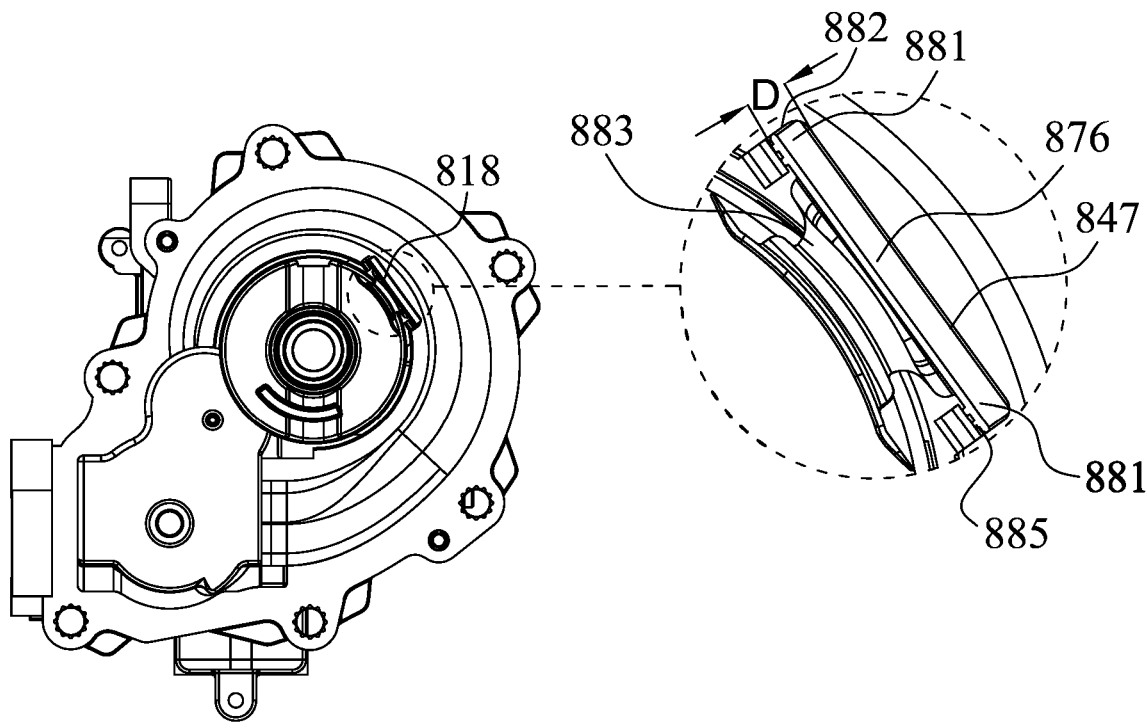
FIG. 8B is a top view of FIG. 8A.
Figure 8C:
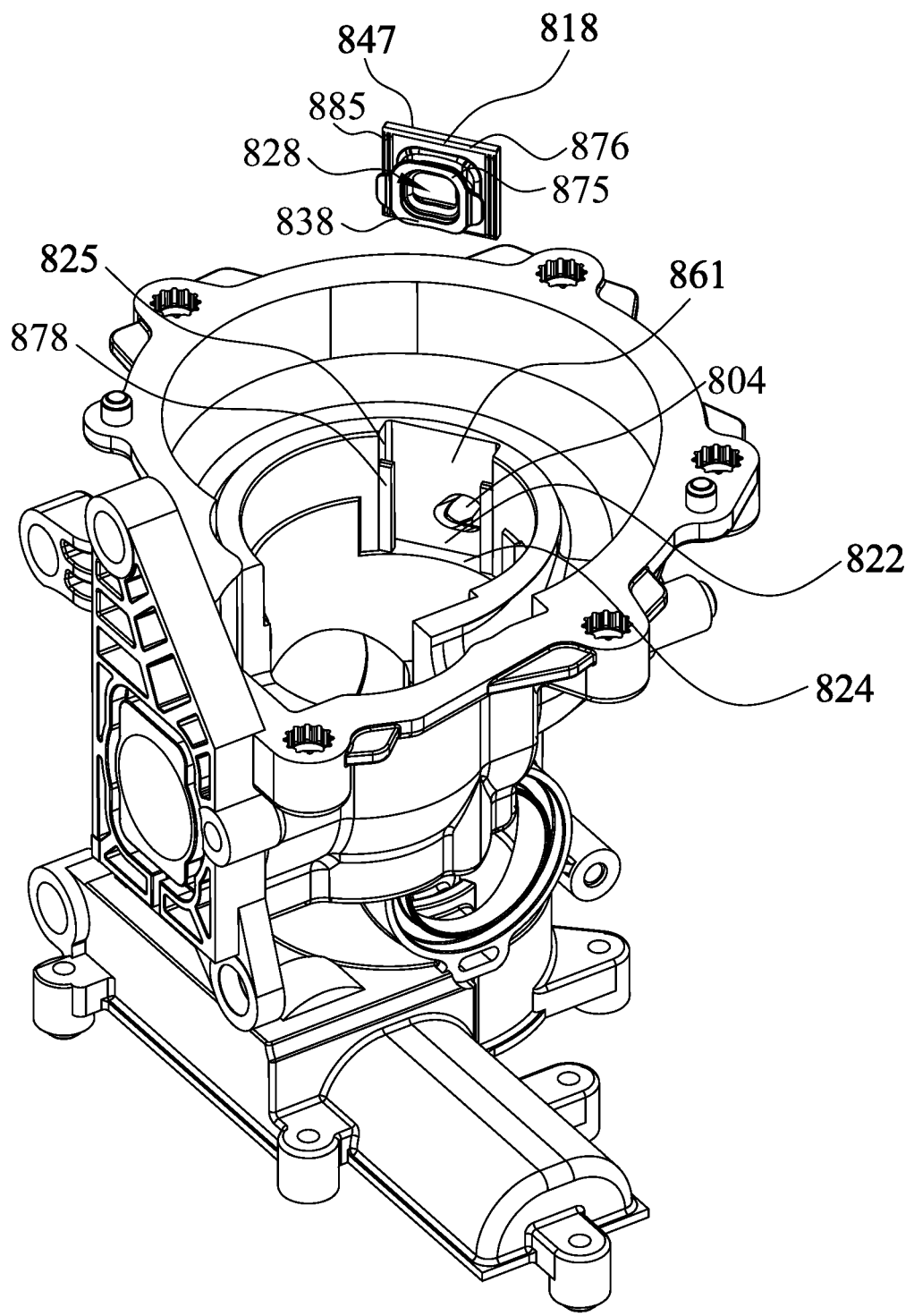
FIG. 8C is an exploded view of FIG. 8A.

FIGS. 8A-8C show a portion of another embodiment of the valve according to the present disclosure, in which FIG. 8A is a structural perspective view of a housing 801 and a seal member 818, FIG. 8B is a top view of FIG. 8A, and FIG. 8C is an exploded view of FIG. 8A. The structure of the valve body in this embodiment is the same as the structure of the valve body 108, and in order to illustrate the structures of the housing 801 and the seal member 818 more clearly, the valve body is not specifically shown in FIGS. 8A-8C.

As shown in FIGS. 8A-8C, similar to the housing 101 and the seal member 118, the housing 801 is also provided with a seal member mounting groove 822 which is disposed in an inner wall 823 around a housing opening 804 and extends from top to bottom, and the seal member mounting groove 822 comprises a groove bottom 887, a pair of side groove walls 825, an end groove wall 824, and an insertion opening 827. The groove bottom 887 forms a housing sealing surface 861. The seal member 818 is inserted into the seal member mounting groove 822 from the insertion opening 827. An anti-off structure 863 is provided between the seal 818 and the seal member mounting groove 822, and a housing sealing structure 864 is provided between the seal member 818 and the housing sealing surface 861 of the housing 801. Moreover, although the valve body is not shown in figures, those skilled in the art would have been appreciated that a valve body sealing structure is also provided between the seal member 818 and the valve body. In this embodiment, the valve body sealing structure is substantially the same as the valve body sealing structure 165 in the valve 100, which will not be described in detail herein. However, the anti-off structure 863 and the housing sealing structure 864 are slightly different from those in the valve 100.

Specifically, in the anti-off structure 863 in this embodiment, a seal member limiting structure 830 on the housing 801 comprises a pair of stop blocks 878 which are respectively disposed on a pair of side groove walls 825 of the seal member mounting groove 822. The pair of stop blocks 878 extend toward each other, and the stop blocks 878 are spaced a distance D from the groove bottom 887. An outer side sealing portion 876 on the seal member 818 is of a substantially thin box shape, with the thickness thereof being substantially equal to or less than the distance D. The outer side sealing portion 876 has a pair of side portions 881 disposed opposite each other in a circumferential direction of the housing. Each of side portions 881 can abut against one stop block 878 so as to clamp the pair of side portions 881 of the seal member 818 between the groove bottom 887 and the pair of stop blocks 878. As an example, inner surfaces of a pair of side portions 881 of the seal member 818 are further provided with ribs 885, and the pair of side portions 881 are in contact with the respective stop blocks 878 by means of the ribs 885. In this embodiment, the seal member 818 can be stopped by a pair of stop blocks 878 and thus cannot move toward the valve body in the radial direction of the housing 801. The side groove walls 825 cannot stop the radial movement of the seal member 818 along the housing 801, and therefore the side groove walls 825 only needs to prevent the seal member 818 from moving in the circumferential direction of the housing 801 and does not need to be obliquely disposed, and can be machined more conveniently.

The length of the seal member 818 (i.e., the distance that the seal member 818 is spaced between the pair of side walls 882 in the circumferential direction of the housing) is less than the spacing distance between the pair of stop blocks 878, such that the outer side sealing portion 876 will not escape between the pair of stop blocks 878. The seal member limiting structure 830 on the housing 801 and the pair of side portions 881 on the seal member 818 together form the anti-off structure 863.

In the housing sealing structure 864 in this embodiment, the housing sealing surface 861 on the housing 801 has a planar shape, and the housing opening 804 is located in the housing sealing surface 861. An outer surface of the outer side sealing portion 876 of the seal member 818 forms an outer side sealing surface 847, and the outer side sealing surface 847 correspondingly has a planar shape as well. When the seal member 818 is mounted in the seal member mounting groove 822, the outer side sealing surface 847 abuts against the housing sealing surface 861 to form the housing sealing structure 864.

As shown in FIGS. 8A-8C, an inner surface of the inner side sealing portion 875 of the seal member 818 forms an inner side sealing surface 838 which is similar to the inner side sealing surface 338 of the seal member 118, and the inner side sealing surface 838 also has an arc shape which is in a shape-fit with the blocking tab of the valve body to enable contact with the blocking tab.

In this embodiment, the seal member 818 further comprises a pair of wings 884. The wings 884 are formed by obliquely extending in opposite directions from two side edges of the inner side sealing portion 875 in the circumferential direction of the housing and slightly obliquely toward the outer side sealing portion 876. The wings 884 have a function similar to that of the chamfered faces 435 of the seal member 118, and can also cooperate with the edge of the blocking tab of the valve body for guide purpose.

Still as shown in FIGS. 8A-8C, in this embodiment, the seal member 818 further comprises a neck 883. The neck 883 is connected between the inner side sealing portion 875 and the outer side sealing portion 876. The neck 883 is of a substantially annular shape, and has a peripheral size less than that of the inner side sealing portion 875 and the outer side sealing portion 876. The interior of the neck 883 is hollow to form, at the interior neck 883, a portion of the seal member channel 828 that penetrates the seal member 818. The neck 883 with a smaller peripheral size facilitates the seal member 818 to deform to a certain extent in the radial direction of the housing, for example, enables the inner side sealing portion 875 to move a distance slightly toward the outer side sealing portion 876. Thus, in this embodiment, the deformation of the seal member 818 can prevent the seal member 818 from interfering the rotation of the valve body and ensure that the inner side sealing surface 838 of the seal member 818 can be tightly abutted the blocking tab of the valve body. As an example, the neck 883 may also have a certain curvature to further facilitate the deformation of the neck, for example, the peripheral size of the neck 883 may gradually decrease from two ends to the middle.

In this embodiment, the height of the inner side sealing portion 875 of the seal member 818 in the axial direction is set to be less than the height of the outer side sealing portion 876, such that interference between the blocking tab 109 and the bearing 106 can be prevented without configuring the inner side opening and the outer side opening of the seal member 818 to be of different shapes, which further facilitates machining.

Although the present disclosure will be described with reference to the specific embodiments shown in the accompanying drawings, it should be understood that the valve of the present disclosure can have many variations without departing from the spirit, scope and background of the teachings of the present disclosure. Those of ordinary skill in the art will also appreciate that there are different ways to alter the structure in the embodiments disclosed in the present disclosure, and all the alterations fall within the spirit and scope of the present disclosure and claims.

We claim:

1. A valve, comprising:
  a housing, an inner wall of the housing defining a housing cavity, the housing being provided with a housing channel, and the housing channel forming a housing opening in the inner wall;
  a valve body, the valve body being disposed in the housing cavity of the housing and can be rotated about an axis and configured to open or close the housing opening;
  a seal member mounting groove, the seal member mounting groove being disposed in the inner wall around the housing opening, and the seal member mounting groove comprising a groove bottom, a groove wall disposed around at least a portion of the groove bottom, and an insertion opening formed by the groove wall, wherein the groove bottom forms a housing sealing surface; and
  a seal member, the seal member being inserted into the seal member mounting groove from the insertion opening, wherein the seal member is configured to come into contact with the valve body and the housing sealing surface when the valve body closes the housing opening so as to enable the valve body to close the housing opening in a sealed manner,
  wherein the seal member mounting groove further comprises a seal member limiting structure, the seal member limiting structure being disposed on the groove wall, and the seal member limiting structure being configured to restrict movement of the seal member toward the valve body relative to the housing.

2. The valve according to claim 1, wherein the groove wall comprises an end groove wall and a pair of side groove walls, the pair of side groove walls being located on a first side and a second side of the groove bottom which are opposite each other, and the end groove wall and the insertion opening being located on a third side and a fourth side of the groove bottom which are opposite each other, and wherein the pair of side groove walls extend in a direction of the axis, and the seal member is inserted into the seal member mounting groove in the direction of the axis.

3. The valve according to claim 2, wherein the seal member limiting structure is symmetrically disposed on the pair of side groove walls.

4. The valve according to claim 3, wherein the seal member comprises an inner side sealing portion and an outer side sealing portion, the inner side sealing portion having an inner side sealing surface, the outer side sealing portion having an outer side sealing surface, the inner side sealing surface being configured to be in a shape-fit with the valve body, and the outer side sealing surface being configured to be in a shape-fit with the housing sealing surface.

5. The valve according to claim 4, wherein the seal member limiting structure comprises a pair of stop blocks, the pair of stop blocks being respectively disposed on the pair of side groove walls and extend toward each other, and wherein the pair of stop blocks are spaced a distance from the groove bottom so as to clamp at least a portion of the seal member between the pair of stop blocks and the groove bottom.

6. The valve according to claim 5, wherein the seal member further comprises a neck, the neck being connected between the inner side sealing portion and the outer side sealing portion, and wherein a peripheral size of the neck is less than peripheral sizes of the inner side sealing portion and the outer side sealing portion.

7. The valve according to claim 6, wherein the peripheral size of the neck gradually decreases from two ends to a middle.

8. The valve according to claim 4, wherein at least portions of the pair of side groove walls obliquely extend toward each other in a direction from the housing to the valve body so as to form the seal member limiting structure, and wherein the seal member is clamped between the seal member limiting structure and the groove bottom.

9. The valve according to claim 8, wherein the seal member further comprises a pair of side walls, the pair of side walls obliquely extending toward each other in a direction from the outer side sealing surface to the inner side sealing surface, and wherein the pair of side walls are configured to respectively cooperate with the seal member limiting structure on the pair of side groove walls.

10. The valve according to claim 4, wherein the valve body comprises a blocking tab, the blocking tab having an arc-shaped valve body sealing surface, and the inner side sealing surface being configured to be in a shape-fit with the arc-shaped valve body sealing surface.

11. The valve according to claim 1, wherein the housing has an open end, and the insertion opening of the seal member mounting groove is disposed at the open end, and wherein the valve further comprises a bearing, the bearing being disposed at the open end of the housing and located above the seal member, and the bearing being configured to compress the seal member to make the seal member tightly position within the seal member mounting groove.

12. The valve according to claim 1, wherein the seal member is made of a hard material.

\* \* \* \* \*